United States Patent [19]

Shimono et al.

[11] Patent Number: 5,348,722
[45] Date of Patent: Sep. 20, 1994

[54] REMOVAL OF DETRIMENTAL METAL IONS FROM HYDROFLUORIC ACID SOLUTION FOR CLEANING SILICON SURFACES

[75] Inventors: Tsugio Shimono; Kenichi Yamamoto, both of Tokyo, Japan

[73] Assignee: NEC Corporation, Tokyo, Japan

[21] Appl. No.: 77,440

[22] Filed: Jun. 17, 1993

[30] Foreign Application Priority Data

Jun. 17, 1992 [JP] Japan .................................. 4-157199
Jan. 22, 1993 [JP] Japan .................................. 5-008740

[51] Int. Cl.$^5$ .................................................. C01B 7/07
[52] U.S. Cl. .................................... 423/488; 423/483; 423/484; 75/726; 156/642
[58] Field of Search ......................... 423/483, 484, 488; 75/726; 156/642

[56] References Cited

U.S. PATENT DOCUMENTS

| | | | |
|---|---|---|---|
| 3,117,000 | 1/1964 | Schlain et al. | 75/726 |
| 3,884,692 | 5/1975 | Griffith et al. | 75/726 |
| 3,902,896 | 9/1975 | Borbely et al. | 75/726 |
| 4,952,386 | 8/1990 | Davison et al. | 423/484 |

FOREIGN PATENT DOCUMENTS 3-102827  4/1991  Japan .

*Primary Examiner*—Michael Lewis
*Assistant Examiner*—N. M. Nguyen
*Attorney, Agent, or Firm*—Sughrue, Mion, Zinn, Macpeak & Seas

[57] ABSTRACT

The invention relates to the removal of detrimental metal ions represented by Cu ion from a hydrofluoric acid solution for use in the manufacturing of semiconductor devices to clean silicon wafer surfaces. The acid solution is brought into contact with silicon granules which are used for the adsorption of the detrimental metal ions. To enhance the adsorption power and the rate of adsorption, the silicon granules are treated in advance to deposit a metal which is lower in ionization tendency than silicon on the surface of each silicon granule so as to partly cover the silicon granule surface by the deposited metal. Particularly Au or Ag is suitable as the metal deposited on the silicon granules.

28 Claims, 4 Drawing Sheets

REMOVAL OF DETRIMENTAL METAL IONS FROM HYDROFLUORIC ACID SOLUTION FOR CLEANING SILICON SURFACES

BACKGROUND OF THE INVENTION

This invention relates to a method of removing detrimental metal ions from a hydrofluoric acid solution used in the manufacturing of semiconductor devices to clean silicon surfaces such as silicon wafer surfaces, the method using silicon granules as adsorbent.

In the manufacturing of integrated circuits including LSIs and VLSIs, an indispensable operation is the cleaning of the surfaces of silicon wafers. With the enlargement of the scale of integration in VLSIs the requirements for the cleanness of silicon wafers have become still severer.

In the cleaning of silicon wafer surfaces the primary purpose is to remove oxide film together with every contaminant, and it is usual to use a hydrofluoric acid solution to remove oxide film by etching. If the hydrofluoric acid solution contains ions of metals such as Cu and Au which are lower in ionization tendency than Si, the metal ions adhere to the cleaned wafer surfaces and affect the electrical characteristics of the semiconductor devices using the wafers. Therefore, it is essential to remove such detrimental metal ions from the hydrofluoric acid solution before the wafer cleaning operation. Although sufficiently refined hydrofluoric acid solutions are available now, often it is necessary to perform a solution refining operation just before the use in oreder to remove contaminants intruded into the acid solutions from containers, piping, etc. Moreover, hydrofluoric acid solutions used for cleaning silicon wafers need to be refined and reused. Since the used acid solutions contain detrimental metal ions which were carried by the silicon wafers, it is necessary to remove the metal ions from the used acid solutions.

It is possible to remove metal ions from an acid solution by a distillation method, but this method is unsuitable for mixed solutions such as hydrofluoric acid solutions used for cleaning silicon wafers because of changes in the chemical composition of the distilled solution. A conventional method is the use of an ion exchange resin. However, in this method the dissolution of organic matter from the ion exchange resin into the treated hydrofluoric acid solution offers a problem. Besides, the ion exchange method is applicable only to dilute hydrofluoric acid solutions: this method is not applicable to solutions having high hydrofluoric acid concentrations (e.g. 20–30%) or solutions containing ammonium fluoride together with hydrofluoric acid.

A recently developed method for the removal of detrimental metal ions represented by Cu ion from a hydrofluoric acid solution used to clean silicon wafers is an adsorption method using silicon granules as adsorbent, as shown in JP 3-102827 A. In the acid solution the metal Si surface of each silicon granule is exposed since oxide film is removed by the etching action of the acid solution. If the acid solution contains Cu ion which is an example of ions of metals lower in ionization tendency than Si, the reduction of Cu ion to metal Cu and the oxidation of metal Si to Si ion take place on the surface of each silicon granule, and the precipitated metal Cu deposits on the silicon granule surface. Therefore, Cu ion is removed from the acid solution. Also Ag ion and Au ion can be removed from the acid solution by the same process. This adsorption method is effective only for the removal of ions of metals lower in ionization tendency than Si, but in the practice of the cleaning of silicon wafers this limitation offers little problem since actual contaminants for silicon wafers in the cleaning solution are the metal ions that can be removed by the adsorption method.

However, by the above described adsorption method the removal of detrimental metal ions from a hydrofluoric acid solution takes a considerably long time because the rate of adsorption is low. In the case of continuously refining a hydrofluoric acid solution by passing the acid solution through a filter unit containing silicon granules as described in the aforementioned JP 3-102827 A, it is impracticable to desirably raise the flow rate of the acid solution because it results in a failure to sufficiently reduce the concentrations of detrimental metal ions in the outflow of the acid solution. Furthermore, by this adsorption method it is very difficult to reduce the concentration of every detrimental metal ion in a hydrofluoric acid solution used to clean silicon wafers to the recently required level which is below 0.1 ppb.

SUMMARY OF THE INVENTION

It is an object of the present invention to provide an improved adsorption method for sufficiently refining a hydrofluoric acid solution for use in the manufacture of semiconductor devices to clean silicon surfaces by rapidly and almost thoroughly removing detrimental metal ions from the acid solution.

A refining method according to the invention uses silicon granules for adsorption of at least one detrimental metal ion contained in a hydrofluoric acid solution to be refined. The improvement according to the invention resides primarily in that, in advance of bringing the hydrofluoric acid solution into contact with the silicon granules, a metal which is lower in ionization tendency than silicon is deposited on the silicon granules so as to partly cover the surface of each silicon granule by the deposited metal.

As the metal to be initially deposited on the silicon granules, Au or Ag is preferred.

When the silicon granules make contact with a hydrofluoric acid solution containing a detrimental metal ion such as Cu ion, the metal initially deposited on each silicon granule provides nuclei of adsorption of the detrimental metal ion from the acid solution. Therefore, the silicon granules having the metal deposit can adsorb the metal ion in the acid solution at a remarkably increased rate of adsorption.

An advantage of the method according to the invention is the possibility of greatly shortening the length of time needed to refine a given quantity of hydrofluoric acid solution. In the case of a continuous method using an adsorption column or filter unit containing silicon granules according to the invention it is possible to sufficiently raise the flow rate of the hydrofluoric acid solution. Furthermore, by the method according to the invention it is possible to reduce the concentration of any detrimental metal ion in the treated hydrofluoric acid solution to below 0.1 ppb.

DESCRIPTION OF THE PREFERRED EMBODIMENTS

In the following description, for convenience, the term "metal" always refers to a metal which is lower than Si in ionization tendency.

Figure 1:
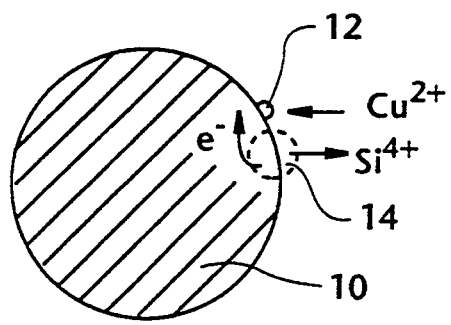
FIG. 1 is an enlarged sectional view of a silicon granule which is assumed to be immersed in a hydrofluoric acid solution containing copper ion and illustrates the mechanism of adsorption of copper ion on the surface of the silicon granule from the solution.

With respect to Cu ion which is a representative of detrimental metal ions to be removed from a hydrofluoric acid solution by the method according to the invention, FIG. 1 illustrates the mechanism of adsorption of Cu ion ($Cu^{2+}$) on the surface of a silicon granule 10 immersed in the acid solution. In the acid solution the silicon granule has an active metal Si surface. Since Si is higher than Cu in ionization tendency the metal Si surface tends to form Si ion ($Si^{4+}$) and liberate electrons, while Cu ion tends to undergo reduction to metal Cu on or in close proximity to the Si surface. When Cu begins to precipitate on the surface of the silicon granule 10, a fractional region of the silicon granule 10 begins to act as a local cell with a local cathode 12 provided by a nucleus of precipitation of Cu (or a minute precipitate of Cu) on the granule surface and a local anode 14 which is a minute area of the active metal Si surface in the vicinity of the local cathode 12. Then, Cu ion proceeds to undergo reduction and precipitate as metal Cu at the local cathode 12. In consequence the silicon granule 10 adsorbs Cu ion with the effect of removing Cu ion from the acid solution. The rate of adsorption depends on the surface area of the local cathode 12, and at an initial stage of the adsorption process the rate of adsorption is very low since the precipitation of Cu does not smoothly proceed until the local cathode 12 appears and expands to some extent.

In the present invention, a metal is deposited on the surface of each silicon granule in advance such that the deposited metal immediately provides a large number of local cathodes of sufficient surface areas when the silicon granule is put into a hydrofluoric acid solution containing a detrimental metal ion.

As the metal to be initially deposited on silicon granules, Au or Ag is preferred. Also it is possible to use Cu in place of Au or Ag, but Cu is undesirable because of its insufficient chemical stability. Cu on the surfaces of silicon granules is oxidized by the air and dissolves in hydrofluoric acid solutions. Therefore, in the case of refining a hydrofluoric acid solution with an adsorption column packed with Cu deposited silicon granules, the acid solution may be contaminated by the outflow of Cu ion from the silicon granules.

The granule size of the silicon granules is not strictly limited and may range from about 0.01 mm to about 5 mm or, rather preferably, from about 0.1 mm to about 2 mm. For efficient adsorption of metal ions it is desirable to use silicon granules having relatively large surface areas, and accordingly it is preferable to use silicon granules not larger than about 1 mm.

The deposition of Au or Ag on silicon granules can be accomplished by stirring a mixture of silicon granules and a dilute hydrofluoric acid solution containing Au ion or Ag ion in a suitable concentration. The operation can be made at room temperature. After that the Au or Ag deposited silicon granules are washed with pure water. The quantity of the deposited Au or Ag can be controlled by controlling the concentration of Au ion or Ag ion in the hydrofluoric acid solution and the quantity of the acid solution per unit weight of silicon granules.

The metal ion adsorption power of Au or Ag deposited silicon granules depends on the content of Au or Ag. For the purpose of reducing the total metal concentration in a hydrofluoric acid solution to less than 0.1 ppb by using silicon granules smaller than about 1 mm, it is suitable to deposit at least 0.1 mg of Au or at least 0.02 mg of Ag per gram of silicon granules. It is possible to deposit up to about 10 mg of Au or Ag per gram of silicon granules. However, it is undesirable to deposit an excessively large quantity of Au or Ag because excessive covering of silicon granule surfaces with the deposited metal reduces the metal ion adsorption capacity of the silicon granules.

Using metal deposited silicon granules according to the invention, a hydrofluoric acid solution containing detrimental metal ions is refined by immersing the silicon granules in the solution in suitable proportions and then stirring the solution or by passing the solution through either an adsorption column packed with the silicon granules or a filter unit containing the silicon granules. In either case the refining treatment can be made at room temperature.

When Au or Ag deposited silicon granules lose the capability to adsorb detrimental metal ions by the accumulation of adsorbed (precipitated) detrimental metal(s), the Au or Ag deposited silicon granules can be regenerated by a treatment with an acid solution which can dissolve the adsorbed metal(s) without dissolving silicon and the metal initially deposited on the silicon particles. According to the need the acid solution may moderately be heated.

EXAMPLE 1

This example illustrates the preparation of gold deposited silicon granules.

In a laboratory reaction vessel, 50 g of silicon granules having diameters of about 1 mm was put into 500 ml of 5% hydrofluoric acid solution containing 1 ppm of Au ion. At room temperature the mixture was stirred for 10 min in order to cause deposition of metal Au on the surfaces of the individual silicon granules from the solution. After that the silicon granules were recovered by filtration and washed with pure water. By the 10-minute stirring operation about 95% of Au ion contained in the hydrofluoric acid solution was reduced to metal Au and deposited on the surfaces of the silicon granules. Therefore, in the Au deposited silicon granules the content of Au was about 0.1 mg per gram of silicon granules.

EXAMPLE 2

This example relates to the use of the Au deposited silicon granules of Example 1 to remove Cu ion from a hydrofluoric acid solution.

In a beaker-like reaction vessel, 2 g of the Au deposited silicon granules was put into 50 ml of 5% hydrofluoric acid solution containing 50 ppb of Cu ion. The temperature of the solution was 23° C. The solution containing the silicon granules was vigorously and continuously stirred, and the concentration of Cu ion in the solution was measured at 5-minute intervals. For comparison, the same operation was made by using 2 g of silicon granules (about 1 mm in diameter) on which neither Au nor any alternative metal was deposited in advance. The results are shown in FIG. 2.

Figure 2:
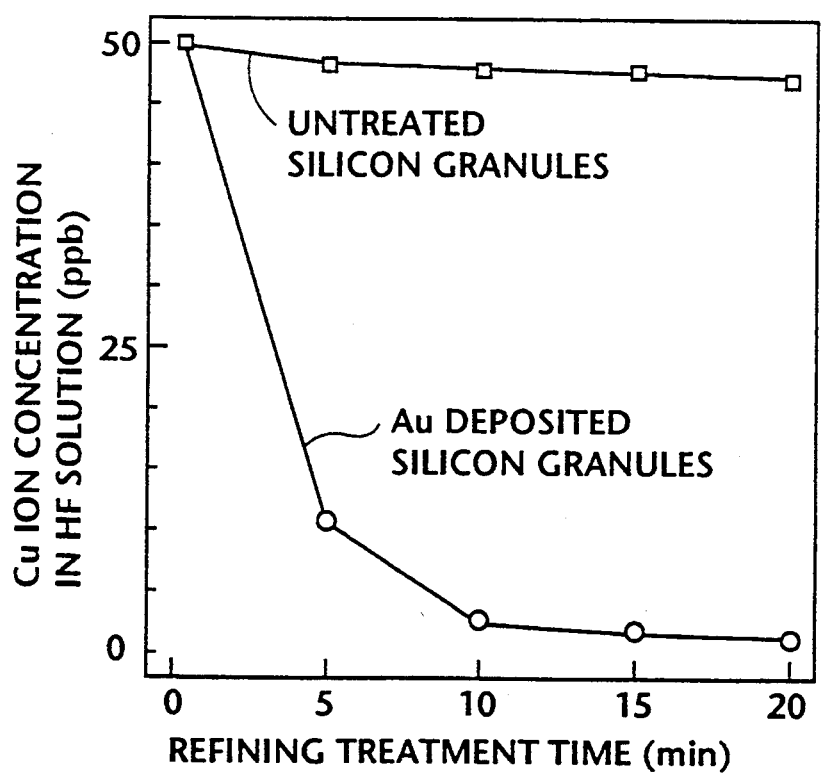
FIG. 2 is a graph showing the result of a copper ion removal test in an example of the invention.

As can be seen in FIG. 2, in about 15 min the concentration of Cu ion in the hydrofluoric acid solution reduced to about 0.5 ppb (1/100 of the initial concentration) by the treatment with the Au deposited silicon granules. However, in the case of using the untreated silicon granules it was almost impossible to reduce the Cu ion concentration in the acid solution.

EXAMPLE 3

An adsorption column method was tested.

Figure 3:
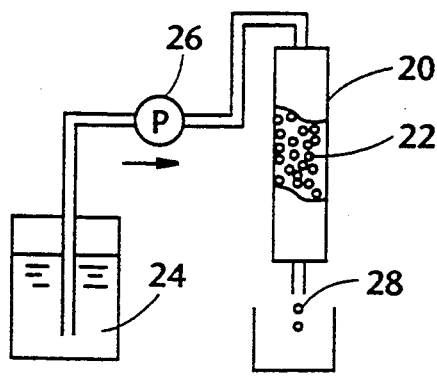
FIG. 3 is a diagrammatic illustration of a hydrofluoric acid solution refining apparatus used in another example of the invention.

Referring to FIG. 3, a column 20 was packed with the Au deposited silicon granules 22 of Example 1. The column 20 was 1 cm in inner diameter and 25 cm in length and had a capacity of 19.5 cm$^3$. The column 20 was held vertical with an inlet at the top and an outlet at the bottom. The object of refining was 5% hydrofluoric acid solution 24 containing 1,000 ppb of Cu ion. The temperature of the acid solution 24 was 23° C. Using a pump 26, the acid solution 24 was continuously fed into the column 20 at a constant rate of 4 ml/min. The concentration of Cu ion in the outflow 28 of the acid solution was measured at 5- to 15-minute intervals.

Figure 4:
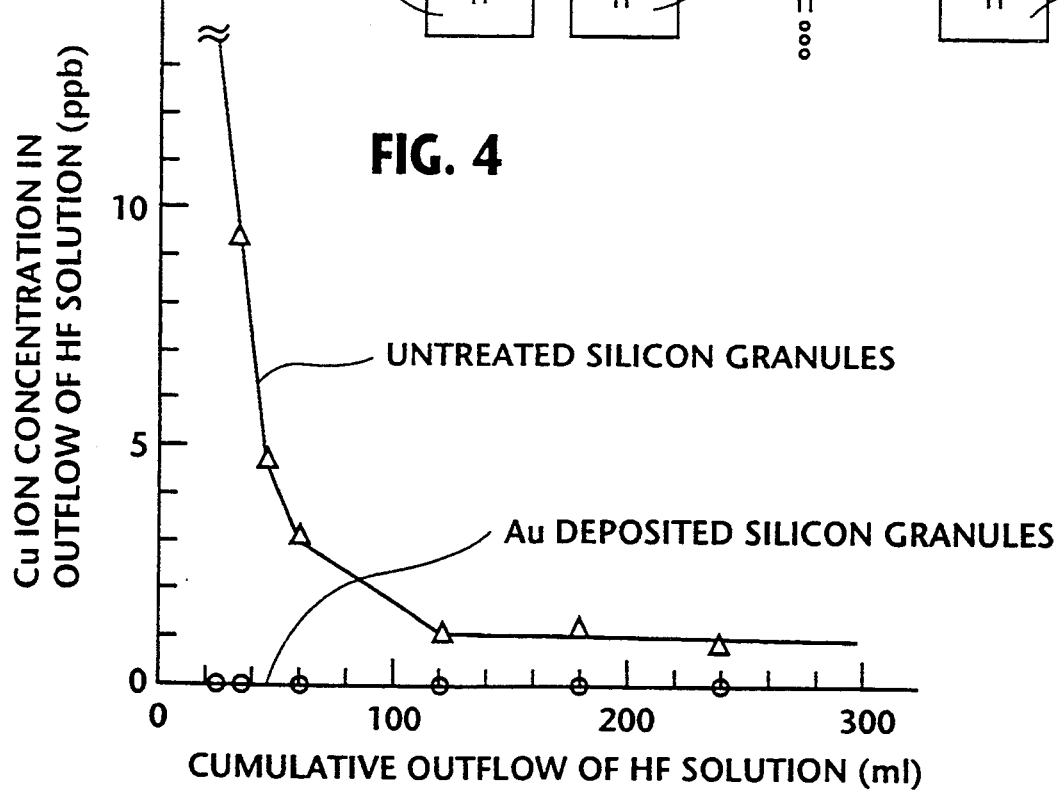
FIG. 4 is a graph showing the result of a copper ion removal test using the apparatus of FIG. 3.

For comparison, the same operation was made by using another column of the same dimensions which was packed with untreated silicon granules (no metal deposition). The results are shown in FIG. 4.

In the case of using the column 10 packed with the Au deposited silicon granules 22, the concentration of Cu ion in the outflow 28 of the acid solution soon became below 0.02 ppb which was the minimum limit of detection. In the case of using the column packed with untreated silicon granules, the concentration of Cu ion in the outflow of the acid solution slowly decreased until the cumulative volume of the outflow reached about 120 ml in about 30 min, and after that the Cu ion concentration remained at a constant level of about 1 ppb.

As a supplementary experiment, the concentration of Cu ion in the 5% hydrofluoric acid solution 24 was increased to 10 ppm, and the flow rate of the acid solution 24 was varied to examine changes in the ultimate concentration of Cu ion in the outflow 28 of the acid solution. The results are shown in the following table.

| Flow Rate (ml/min) | Cu Ion Concentration (ppb) with Au deposited silicon granules | with untreated silicon granules |
|---|---|---|
| 4.0 | <0.02 | 1.0 |
| 6.0 | <0.02 | 2.1 |
| 8.0 | <0.02 | |
| 12.0 | 0.05 | |

With the column packed with untreated silicon granules, the outflow of the acid solution contained 1 ppb of Cu ion even when the flow rate of the acid solution was relatively low at 4 ml/min. With the column packed with the Au deposited silicon granules, the concentration of Cu ion in the outflow of the acid solution was lower than 0.1 ppb even when the flow rate was increased to 12 ml/min. That is, by using Au deposited silicon granules in place of untreated silicon granules it is possible to refine a hydrofluroric acid solution containing Cu ion at a greatly raised speed and hence greatly shorten the length of time needed to refine a given quantity of the acid solution.

Figure 5:
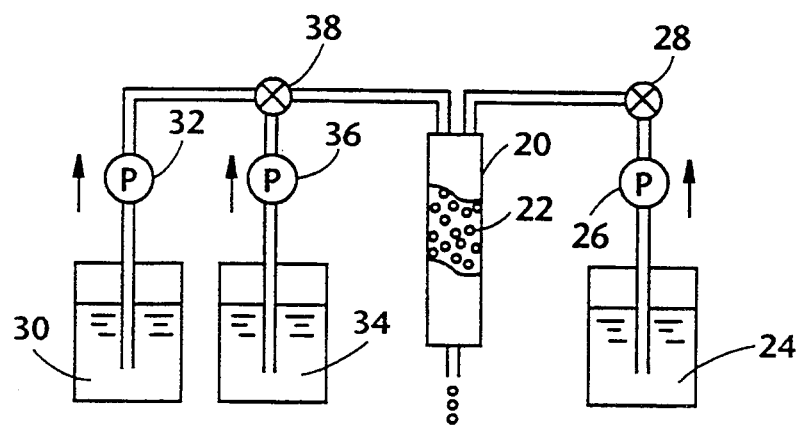
FIG. 5 is a diagrammatic illustration of the addition of an adsorbent regeneration system to the apparatus of FIG. 3.

FIG. 5 illustrates regeneration of the Au deposited silion granules 22 in the adsorption column 20 in FIG. 3.

It is inevitable that the adsorption capability of the column 20 lowers by an increase in the cumulative quantity of Cu (detrimental metal) adsorbed on the Au deposited silicon granules 22. To restore the initial adsorption capability by removing Cu from the Au deposited silicon granules 22, the column 20 in FIG. 5 is provided with a supply of an acid solution 30 which can dissolve Cu without dissolving Si and Au and a supply of pure water 34. Numerals 32 and 36 indicate pumps and numerals 28 and 38 valves.

For example, after lowering of the adsorption capability of the column 20 used in Example 3 the column 20 was treated with 200 ml of 5N nitric acid (30) heated at 60° C. and then washed with pure water (34). By this treatment Cu on the silicon granules 22 in the column 20 was almost completely removed while Au on the silicon granules remained unaffected. That is, the Au deposited silicon granules 22 were regenerated to resume the initial state.

The following examples illustrate sufficient quantities of Au or Ag to be deposited on silicon granules.

EXAMPLE 4

In a laboaratory reaction vessel, Au was deposited on the surfaces of granular silicon granules having diameters of 0.1-1 mm from 4.9% hydrofluoric acid solution containing Au ion. To vary the quantity of deposited Au, the concentration of Au ion in the acid solution was varied in the range from 0 to 50 ppm. In every case 2 g of silicon granules was put into 50 ml of the acid solution at room temperature, and the solution was stirred with a magnetic stirrer for 15 min. After that the treated silicon granules were recovered and washed with pure water. The quantity of deposited Au ranged from 0 to 1.25 mg per gram of silicon granules.

The object of refining was 4.9% hydrofluoric acid solution containing 50 ppb of Cu ion. In every case 2 g of the Au deposited silicon granules was put into 50 ml of the acid solution, and the solution was continuously stirred at room temperature. The concentration of Cu ion in the treated acid solution was measured at 5-minute intervals. The results are shown in FIG. 6.

Figure 6:
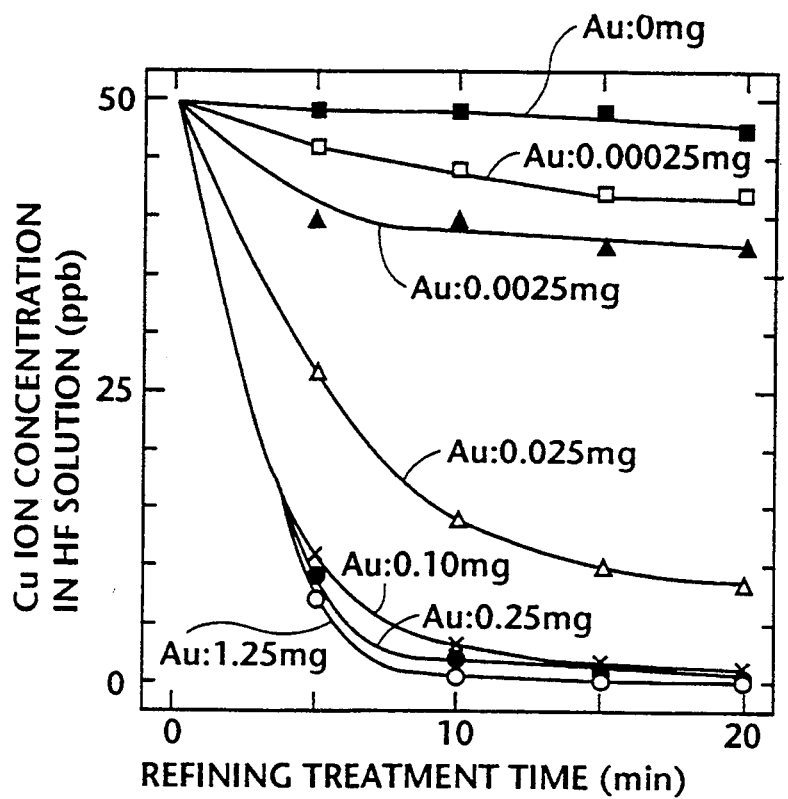
FIGS. 6 to 9 are graphs showing the results of experiments on the dependence of the efficiency of removing copper ion from a hydrofluoric acid solution or a hydrofluoric acid-ammonium fluoride mixed solution by using gold or silver deposited silicon granules on the quantity of the deposited gold or silver.

As can be seen in FIG. 6, when the quantity of Au on 1 g of the silicon granules was 0.10 mg or larger the concentration of Cu ion in the acid solution could be reduced to below the lower limit of detection (0.02 ppb). It was almost impossible to reduce the Cu ion concentration by using untreated silicon granules (without deposition of Au).

EXAMPLE 5

The Au deposited silicon granules of Example 4 were used to refine a mixed solution of ammonium fluoride and hydrofluoric acid containing 50 ppb of Cu ion. In every case 2 g of the Au deposited silicon granules was put into 50 ml of the mixed solution, and the solution was stirred at room temperature. The concentration of Cu ion in the treated solution was measured at 5-minute intervals. The results are shown in FIG. 7.

Figure 7:
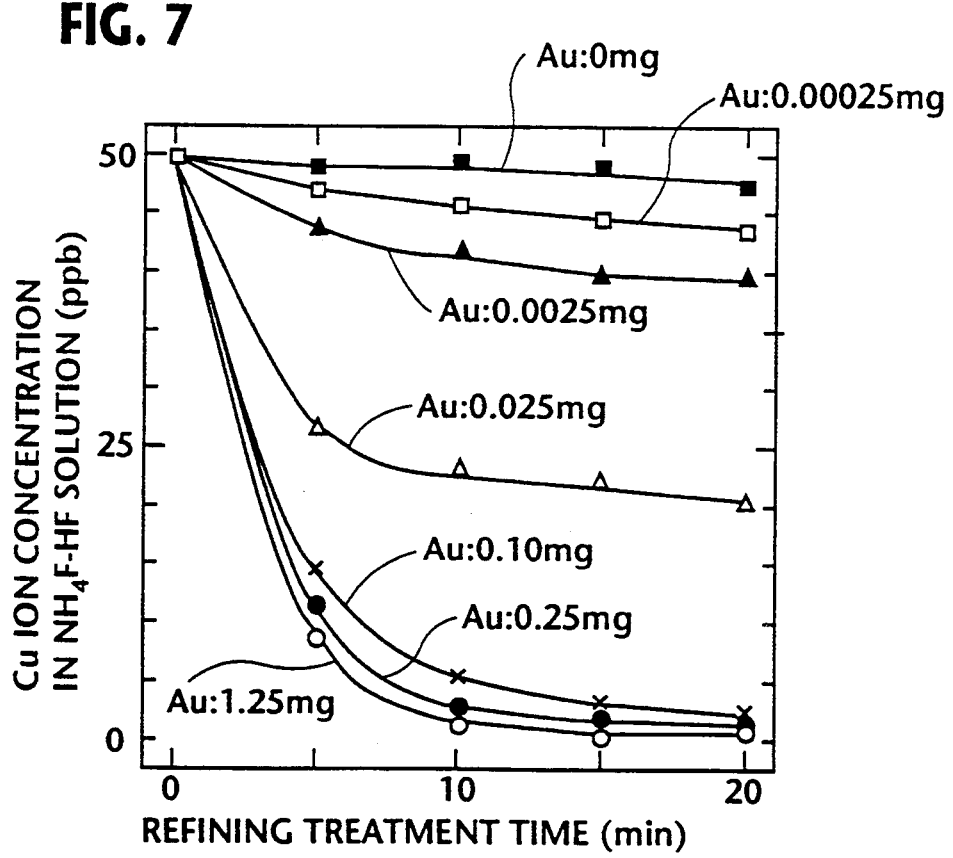

As can be seen in FIG. 7, when the quantity of Au on 1 g of the silicon granules was 0.25 mg or larger the concentration of Cu ion in the mixed solution could be reduced to below the lower limit of detection (0.02 ppb).

EXAMPLE 6

In a laboaratory reaction vessel, Ag was deposited on the surfaces of silicon granules having diameters of 0.1–1 mm from 4.9% hydrofluoric acid solution containing Ag ion. To vary the quantity of deposited Ag, the concentration of Ag ion in the acid solution was varied in the range from 0 to 50 ppm. In every case 2 g of silicon granules was put into 50 ml of the acid solution at room temperature, and the solution was stirred with a magnetic stirrer for 15 min. After that the treated silicon granules were recovered and washed with pure water. The quantity of precipitated Ag ranged from 0 to 1.25 mg per gram of silicon granules.

The object of refining was 4.9% hydrofluoric acid solution containing 50 ppb of Cu ion. The refining test method was the same as in Example 4. The results are shown in FIG. 8.

Figure 8:
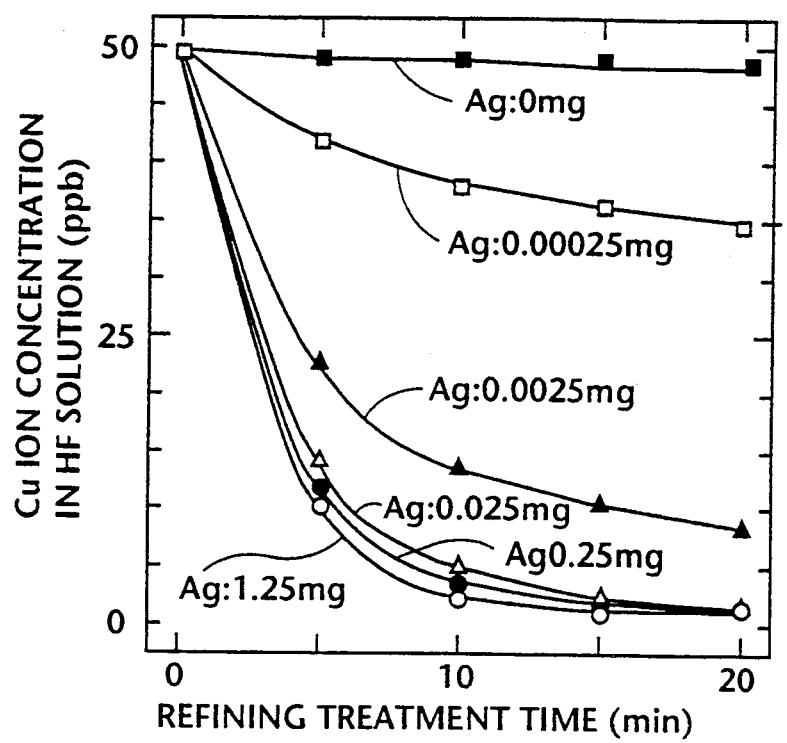

As can be seen in FIG. 8, when the quantity of Ag on 1 g of the silicon granules was 0.025 mg or larger the concentration of Cu ion in the acid solution could be reduced to below the lower limit of detection (0.02 ppb).

EXAMPLE 7

The Ag deposited silicon granules of Example 6 were used to refine a mixed solution of ammonium fluoride and hydrofluoric acid containing 50 ppb of Cu ion. The refining test method was the same as in Example 5. The results are shown in FIG. 9.

Figure 9:
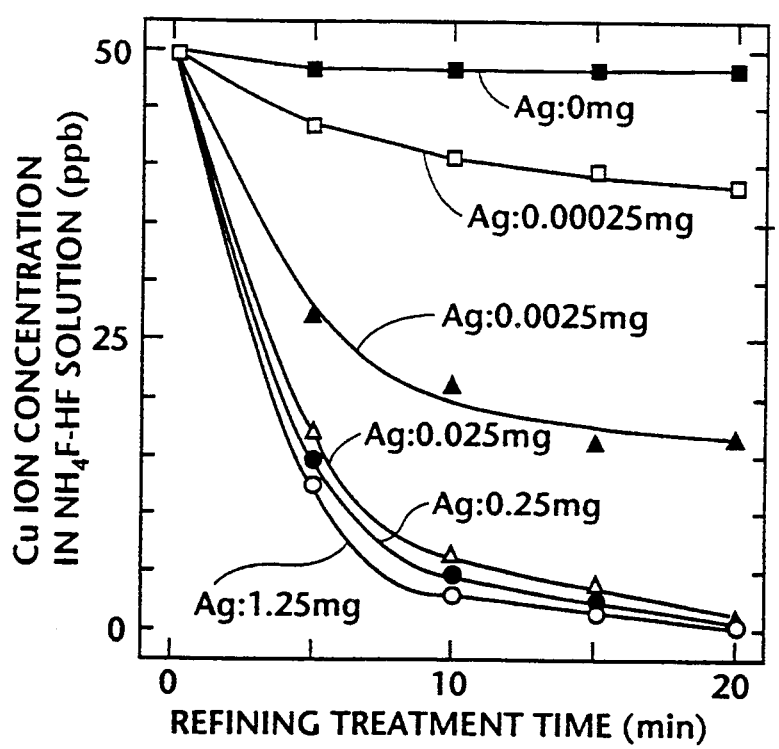

As can be seen in FIG. 9, when the quantity of Ag on 1 g of the silicon granules was 0.025 mg or larger the concentration of Cu ion in the mixed solution could be reduced to below the lower limit of detection (0.02 ppb).

What is claimed is:

1. In a method of refining a hydrofluoric acid solution for use in the manufacturing of semiconductor devices to clean silicon surfaces by removing at least one detrimental metal ion from the acid solution by bringing the acid solution into contact with silicon granules for adsorption of the detrimental metal ion or ions on the surfaces of the silicon granules, the improvement comprising depositing a metal which is lower in ionization tendency than silicon on said silicon granules so as to partly cover the surface of each silicon granule by the deposited metal in advance of placing said partly covered silicon granules in either an adsorption column or a filter unit for the contact of the silicon granules with the hydrofluoric acid solution.

2. A method according to claim 1, wherein said metal is selected from the group consisting of gold and silver.

3. A method according to claim 1, wherein said silicon granules in the range from about 0.01 mm to about 5 mm in granule size.

4. A method according to claim 3, wherein said silicon granules are not larger than 1 mm in granule size.

5. In a method of refining a hydrofluoric acid solution for use in the manufacturing of semiconductor devices to clean silicon surfaces by removing at least one detrimental metal ion from the acid solution by bringing the acid solution into contact with silicon granules for adsorption of the detrimental metal ion or ions on the surfaces of the silicon granules, the improvement comprising depositing a metal which is lower in ionization tendency than silicon on said silicon granules so as to partly cover the surface of each silicon granule by the deposited metal in advance of the contact of the silicon granules with the hydrofluoric acid solution, wherein said silicon granules are not larger than 1 mm in granule size, and wherein said metal is gold, the quantity of said gold being at least 0.1 mg per gram of said silicon granules.

6. In a method of refining a hydrofluoric acid solution for use in the manufacturing of semiconductor devices to clean silicon surfaces by removing at least one detrimental metal ion from the acid solution by bringing the acid solution into contact with silicon granules for adsorption of the detrimental metal ion or ions on the surfaces of the silicon granules, the improvement comprising depositing a metal which is lower in ionization tendency than silicon on said silicon granules so as to partly cover the surface of each silicon granule by the deposited metal in advance of the contact of the silicon granules with the hydrofluoric acid solution, wherein said silicon granules are not larger than 1 mm in granule size, and wherein said metal is silver, the quantity of said silver being at least 0.02 mg per gram of said silicon granules.

7. A method according to claim 1, wherein said at least one detrimental ion comprises copper ion.

8. A method according to claim 1, wherein the contact of the hydrofluoric acid solution with said silicon granules is accomplished by agitating a dispersion of said silicon granules in the hydrofluoric acid solution.

9. A method according to claim 1, wherein the hydrofluoric acid solution is brought into contact with said silicon granules by passing the hydrofluoric acid solution through an adsorption column packed with said silicon granules.

10. A method according to claim 1, wherein said metal is deposited on the surfaces of said silicon granules by treating said silicon granules with a hydrofluoric acid solution containing said metal in the form of ion.

11. In a method of refining a hydrofluoric acid solution for use in the manufacturing of semiconductor devices to clean silicon surfaces by removing at least one detrimental metal ion from the acid solution by bringing the acid solution into contact with silicon granules for adsorption of the detrimental metal ion or ions on the surfaces of the silicon granules, the improvement comprising depositing a metal which is lower in ionization tendency than silicon on said silicon granules so as to partly cover the surface of each silicon granule by the deposited metal in advance of the contact of the silicon granules with the hydrofluoric acid solution, and further comprising the step of regenerating said silicon granules when the adsorption power of the silicon granules lowers, the regeneration step comprising cleaning said silicon granules with an acid solution which dissolves at least one detrimental metal adsorbed on the surfaces of the silicon granules without dissolving silicon and the metal initially deposited on the surfaces of the silicon granules.

12. A method according to claim 5, wherein said at least one detrimental ion comprises copper ion.

13. A method according to claim 5, wherein the contact of the hydrofluoric acid solution with said silicon granules is accomplished by agitating a dispersion of said silicon granules in the hydrofluoric acid solution.

14. A method according to claim 5, wherein the hydrofluoric acid solution is brought into contact with said silicon granules by passing the hydrofluoric acid solution through an adsorption column packed with said silicon granules.

15. A method according to claim 5, wherein said metal is deposited on the surfaces of said silicon granules by treating said silicon granules with a hydrofluoric acid solution containing said metal in the form of ion.

16. A method according to claim 6, wherein said at least one detrimental ion comprises copper ion.

17. A method according to claim 6, wherein the contact of the hydrofluoric acid solution with said silicon granules is accomplished by agitating a dispersion of said silicon granules int eh hydrofluoric acid solution.

18. A method according to claim 6, wherein the hydrofluoric acid solution is brought into contact with said silicon granules by passing the hydrofluoric acid solution through an adsorption column packed with said silicon granules.

19. A method according to claim 6, wherein said metal is deposited on the surfaces of said silicon granules by treating said silicon granules with a hydrofluoric acid solution containing said metal in the form of ion.

20. A method according to claim 11, wherein said metal is selected from the group consisting of gold and silver.

21. A method according to claim 11, wherein said silicon granules in the range from about 0.0 mm to about 5 mm in granule size.

22. A method according to claim 21, wherein said silicon granules are not larger than 1 mm in granule size.

23. A method according to claim 22, wherein said metal is gold, the quantity of said gold being at least 0.1 mg per said silicon granules.

24. A method according to claim 22, wherein said metal is silver, the quantity of said silver being at least 0.02 mg per gram of said silicon granules.

25. A method according to claim 11, wherein said at least one detrimental ion comprises copper ion.

26. A method according to claim 11, wherein the contact of the hydrofluoric acid solution with said silicon granules is accomplished by agitating a dispersion of said silicon granules in the hydrofluoric acid solution.

27. A method according to claim 11, wherein the hydrofluoric acid solution is brought into contact with said silicon granules by passing the hydrofluoric acid solution through an adsorption column packed with said silicon granules.

28. A method according to claim 11, wherein said metal is deposited on the surface of said silicon granules by treating said silicon granules with a hydrofluoric acid solution containing said metal in the form of ion.

* * * * *